April 23, 1946.  H. W. WELCH  2,398,900
WIRE COILING MACHINE
Filed May 31, 1943  3 Sheets-Sheet 1
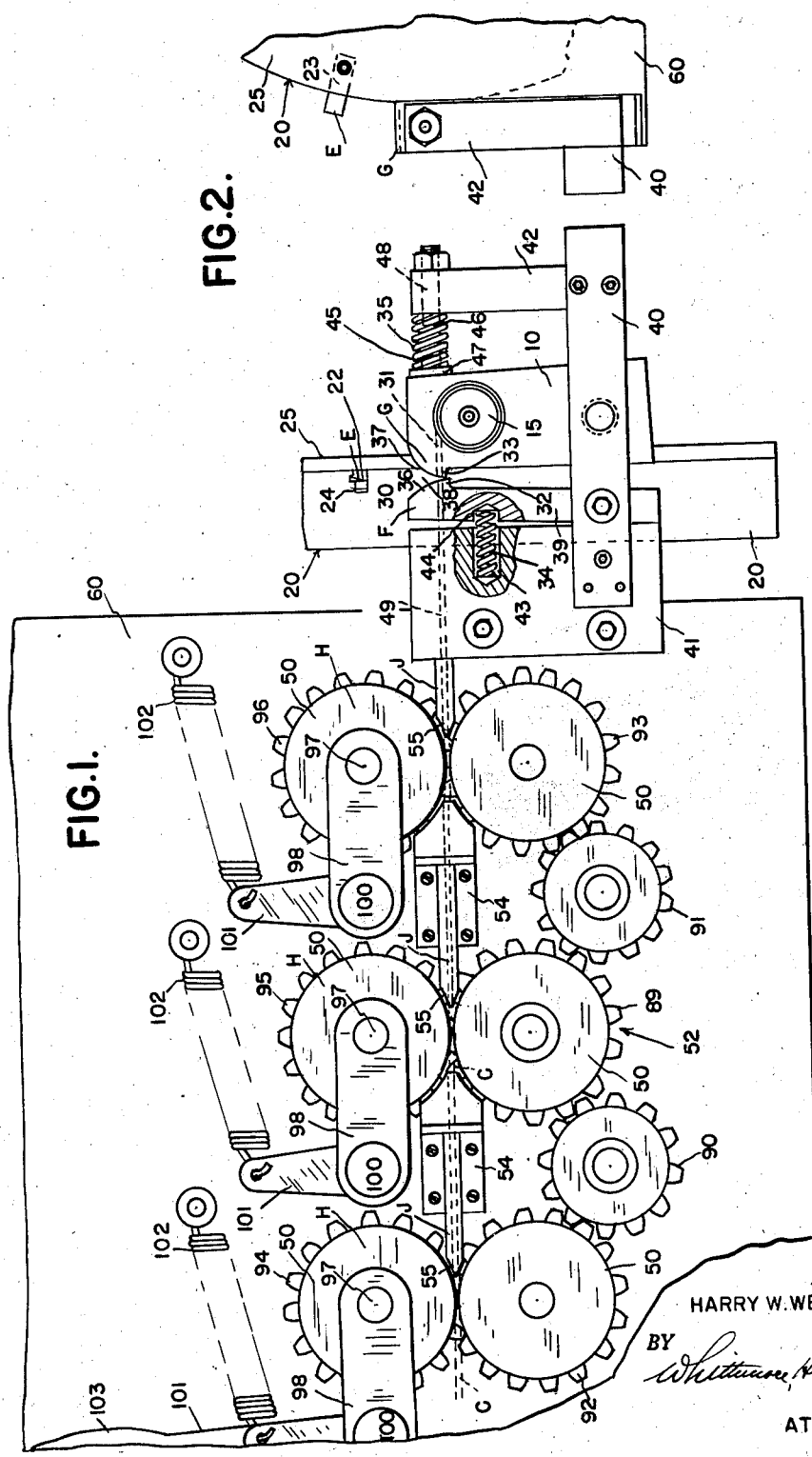
INVENTOR.
HARRY W. WELCH
BY
ATTORNEYS April 23, 1946.　　　H. W. WELCH　　　2,398,900
WIRE COILING MACHINE
Filed May 31, 1943　　　3 Sheets-Sheet 2

*INVENTOR.*
HARRY W. WELCH
BY
ATTORNEYS

April 23, 1946.                    H. W. WELCH                    2,398,900
                              WIRE COILING MACHINE
                        Filed May 31, 1943            3 Sheets-Sheet 3
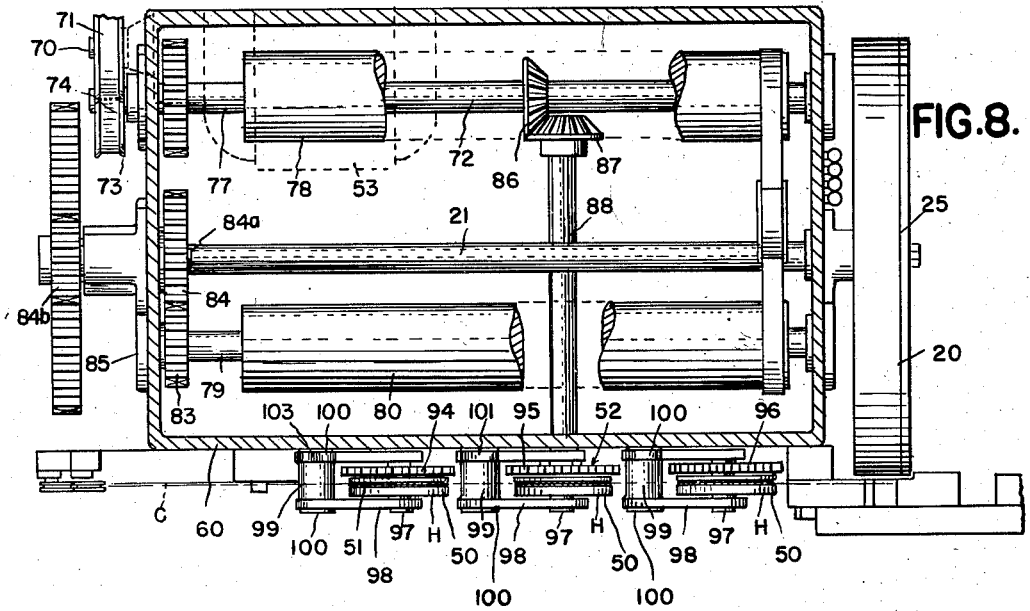
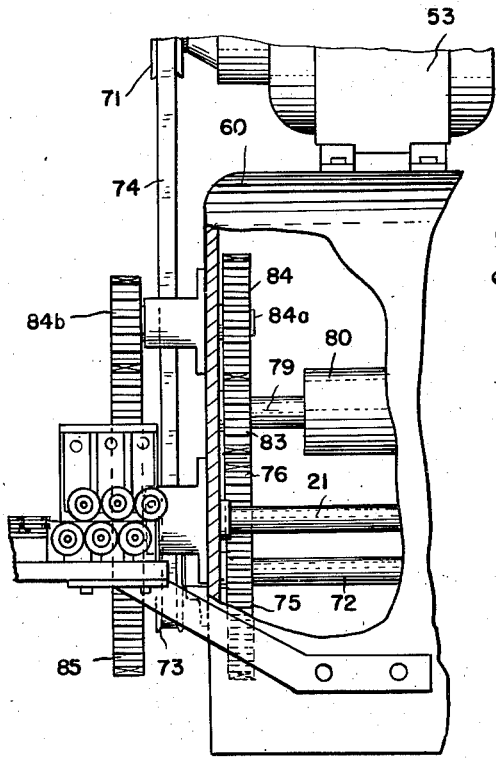
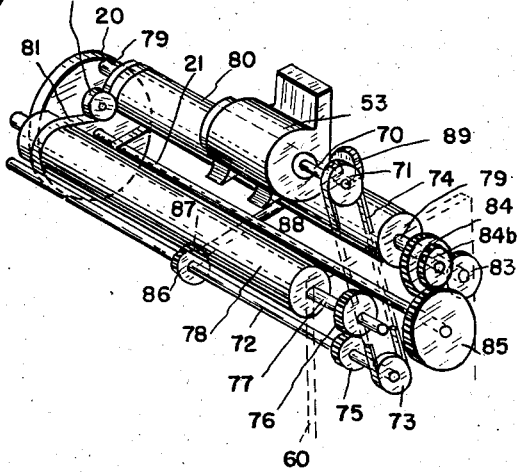
INVENTOR.
HARRY W. WELCH
ATTORNEYS Patented Apr. 23, 1946

2,398,900

UNITED STATES PATENT OFFICE 2,398,900

WIRE COILING MACHINE

Harry W. Welch, Walled Lake, Mich., assignor to Novi Equipment Company, Novi, Mich., a corporation of Michigan Application May 31, 1943, Serial No. 489,219

13 Claims. (Cl. 153—66)

This invention relates generally to wire coiling machines and refers more particularly to a machine for producing predetermined lengths of coiled wire from straight wire stock.

One of the essential objects of the invention is to provide a machine capable of rapidly and accurately producing wire coils of uniform configuration.

Another object is to provide a machine wherein cooperating stationary members form the wire coils as the stock is advanced relative thereto.

Another object is to provide a machine wherein a support for the coil forming members has an outlet through which the coils may be discharged from the machine after being severed from the stock.

Another object is to provide a machine wherein a knife or cutter carried by a wheel rotating in timed relation to the advancement of the stock is employed to sever the stock to limit the length of the coils.

Another object is to provide a machine wherein opposed spring pressed guide members for the wire are provided beneath the wire with cooperating portions that normally abut each other to support the wire in the path of the knife before the severing operation but are adapted to be momentarily moved apart by the knife during the severing operation to permit its uninterrupted movement therebetween following the severing operation.

Another object is to provide a machine wherein one of the opposed guide members for the wire is carried by the support for the coil forming members.

Another object is to provide a machine wherein rotating means such as spaced sets of cooperating rolls are arranged in tandem for advancing the stock through the opposed guide members to the coil forming members.

Another object is to provide a machine wherein a tubular member is provided in advance of each set of rolls to guide the wire and prevent it from buckling as it is advanced.

Another object is to provide a machine that is simple in construction, economical to manufacture and efficient in operation.

Other objects, advantages and novel details of construction of this invention will be made more apparent as this description proceeds, especially when considered in connection with the accompanying drawings, wherein:

Figure 1 is an elevational view of a machine embodying my invention with parts broken away and in section;

Figure 2 is a fragmentary end view of the construction illustrated in Figure 1;

Figure 8 is a fragmentary horizontal sectional view through the machine;

Figure 9 is a fragmentary vertical sectional view through the machine;

Figure 10 is an isometric view of the driving mechanism and associated parts.

Figure 3:
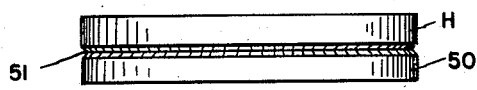
Figure 3 is a plan view of one of the rolls employed for advancing the stock.
Figure 4:
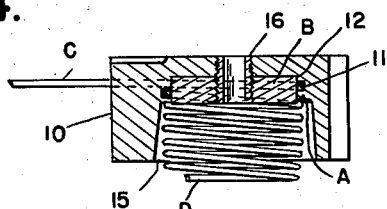
Figure 4 is a horizontal sectional view through the coil forming members and support therefor.

Referring now to the drawings, A and B respectively are the cooperating members for forming straight wire stock C into coils such as D, E is the knife or cutter for severing the wire, F and G respectively are the opposed guide members for the wire, H are spaced sets of rolls for advancing the wire from a suitable source of supply through the guide members F and G to the wire forming members, and J are tubular guide members in advance of the respective sets of rolls to receive the wire and prevent it from buckling as it is advanced.

Figure 6:
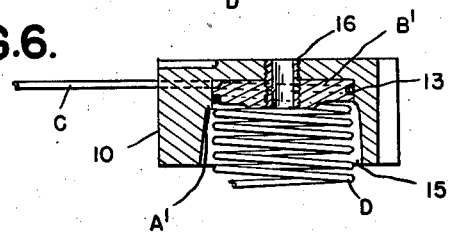
Figure 6 is a view similar to Figure 4 but showing a slight modification.
Figure 5:
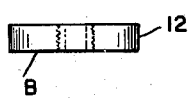
Figure 5 is a plan view of one of the coil forming members illustrated in Figure 4.
Figure 7:
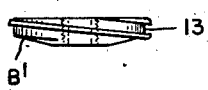
Figure 7 is a view similar to Figure 5 but showing the modified form of coil forming member embodied in Figure 6.

As shown, the coil forming member A comprises an annular portion of an upright member 10, while the cooperating coil forming member B comprises a stationary disc wheel insert for said annular portion A. Preferably the annular portion A contains a spiral groove 11 through which the wire is advanced as it is coiled, while the periphery 12 of the insert B is plain and fits snugly within the annular portion A as a cover for the spiral groove 11 whereby wire advanced in the spiral groove between said members will be shaped thereby into tubular coils such as D. An alternative construction is illustrated in Figures 6 and 7 wherein the periphery of the insert B' may contain a spiral groove 13, and the annular portion A' may be plain and serve as a cover for the groove 13 so that wire advanced in the groove 13 between said members will be shaped thereby into tubular coils such as D.

The upright member 10 constitutes a common support for both coil forming members A and B and is provided beside the annular portion A with a circular opening 15 through which the formed coils may be discharged from the machine into a suitable receptacle (not shown). The insert B is retained in the annular portion A of the member 10 by a tubular element 16 that extends through aligned holes in and threadedly engages both the member 10 and insert B.

The knife or cutter E for severing the wire to limit the length of coils formed by the members A and B projects radially from the periphery of a wheel 20 which is rotated by shaft 21 in timed relation to the advancement of the wire stock C. Preferably this knife E has a wedge-shaped cutting portion 22 engageable with the wire C and has a suitable shank 23 within a recess 24 in the wheel 20 and held in place by a plate 25 bolted to said wheel.

The opposed guide members F and G for the wire have aligned holes 30 and 31 respectively through which the wire passes to the coil forming members A and B, and have portions 32 and 33 respectively just below the opposed ends of said holes that are normally held by coil springs 34 and 35 respectively in abutting relation with each other to support the wire C in the path of the knife E before the severing operation and are adapted to be momentarily moved apart against tension of the springs 34 and 35 by the knife E as it passes downwardly between said portions during the severing operation to permit its uninterrupted movement following the severing operation. Preferably the opposed faces 36 and 37 respectively of the guide members F and G curve upwardly in opposite directions from the wire supporting portions 32 and 33 to the upper faces of said guide members so as to provide an upwardly opening substantially V-shaped entrance slot 38 for the knife.

The guide member G is at the upper end of and integral with the upright member 10, while the guide member F is at the upper end of and integral with an upright member 39 disposed adjacent and substantially parallel to the upright member 10.

The upright members 10 and 39 are pivotally connected at their lower ends to a substantially horizontal bar 40 and are located between uprights 41 and 42 respectively that are rigidly connected at their lower ends to said bar. The coil spring 34 terminally engages aligned sockets 43 and 44 respectively in the upright members 41 and 39, while the coil spring 35 is between the upright members 10 and 42 and is preferably carried by the heads 45 and 46 respectively of suitable supporting elements 47 and 48 respectively fastened to said members 10 and 42. The upright 41 also serves as a guide member for the wire C and for this purpose has a hole 49 through which the wire is adapted to pass to the aligned holes 30 and 31 respectively in the guide members F and G.

The spaced sets of rolls H are arranged in tandem for advancing the wire stock C from a suitable source (not shown) through the holes 49, 30 and 31 respectively in the guide members 41, F and G to the coil forming members A and B. Each set consists of two vertically spaced driven rolls 50 having knurled grooves 51 in the periphery thereof for engagement with the wire. Any suitable means such as gearing 52 may be employed for driving the rolls 50 and such means is preferably operated from the same source of power such as an electric motor 53 that is employed for driving the shaft 21 for the knife carrying wheel 20, so that the latter may operate in timed relation to the advancement of the stock.

The tubular guide members J are located in advance of the respective sets of rolls 50 to receive the wire stock C and prevent it from buckling as it is advanced toward the guide members 41, F and G. Preferably the foremost of these tubular members J is rigid with the upright 41 while the other tubular members J are rigid with suitable supports 54. Each of the tubular members J has a tapered end 55 close to and in horizontal alignment with the space between each set of rolls 50 so as to receive the wire immediately after it leaves said rolls.

In use, the wire stock C is advanced by the rolls 50 through the guide members J, 41, F and G to the coil forming members A and B which transform it into coils such as D as the wire advances in the spiral groove 11 relative to said members. During each revolution of the wheel 20 the knife E carried thereby will sever the advancing wire C as it is supported on the abutting portions 32 and 33 and will then pass downwardly between and beyond such portions. The springs 34 and 35 will momentarily yield to permit the downward movement of the knife between the portions 32 and 33 and then will return such portions into abutting relation with each other. As each new coil is made it pushes the one previously made outwardly through the discharge opening 15 from which it may fall into a suitable receptacle (not shown).

Thus, from the foregoing, it will be apparent that the operation of the machine may be continuous to produce rapidly one coil after another until the desired number of coils is obtained. Preferably the source of power such as the electric motor 53, and the transmission mechanism for the shaft 21 and rolls 50 may be located within or carried by a suitable housing 60 which may be utilized as a support for the elements of the machine embodying my invention. For example, the upright 41 is preferably bolted to the housing 60 and carries the bar 40 upon which the uprights 39, 10 and 42 respectively are mounted.

In the present instance the wire stock C is made of copper, and the formed coils D are employed in the manufacture of incendiary bombs, however the stock may be formed of any suitable material and the formed coils may be employed for any suitable purpose, as desired. Moreover, any desired number of knives such as E may be employed on the wheel 20 to cut the wire stock C, depending upon the length of coils D desired. In this connection the movements of the knife E and roll 50 relative to each other and the location of the cutting operations relative to the coil forming members A and B are such that the advancing wire is severed at the proper points and at the proper time to insure uniformity and accuracy in the production of the coils. Consequently, after the desired number of knives are mounted on the wheel 20, the coils D formed during the subsequent operations of the machine will have a predetermined length and will be uniform in configuration.

For driving the wheel 20 in timed relation to the rolls 50, the electric motor 53 has a shaft 70 provided with a pulley 71. A shaft 72 also has a pulley 73 and a belt 74 is reeved on said pulleys 71 and 73 respectively. A gear 75 is rigid with shaft 72 and meshes with a gear 76 rigid with a shaft 77 carrying a roll 78. A shaft 79 is substantially parallel to shaft 77 and also carries a roll 80. An endless belt 81 is reeved on the rolls 78 and 80 and is engaged by a suitable belt tightener 82. A gear 83 is rigid with shaft 79 and meshes with an idler gear 84 on a stub shaft 84a carrying a gear 84b meshing with a gear 85 that in turn is rigid with the shaft 21 for the wheel 20 carrying the knife E. A bevel gear 86 is rigid with shaft 72 and meshes with a bevel gear 87 rigid with a cross shaft 88 to which a gear 89 of the gearing 52 is rigidly connected. Preferably the gear 89 meshes with idler gears 90 and 91 which in turn mesh with gears 92 and 93. Gears 94, 95 and 96 respectively mesh with and are driven by gears 92, 89 and 93 respectively.

Stub shafts 97 carry side by side the rolls 50 and their respective drive gears 94, 95 and 96 respectively, and such stub shafts 97 are in turn carried by the furcations or arms 98 of yokes 99 fixed to pivots 100 carried by the casing 60. Levers 101 are rigid with and project upwardly from the pivots 100 and are connected to coil springs 102 anchored to the casing 60. Thus the springs 102 normally maintain the gears 94, 95 and 96 respectively in proper meshing engagement with the gears 92, 89 and 93 respectively, and also maintain the upper rolls 50 in proper operative position relative to the lower rolls 50. To enable the wire C to be initially fed by hand between the rolls 50, the first lever 101 is provided with a handle 103 by which the first yoke 99 may be swung on its pivot 100 to raise the roll 50 carried thereby relative to the cooperating lower roll 50.

What I claim as my invention.

1. A machine having means for coiling wire, means for advancing the wire through the coiling means to be coiled thereby, a rotatably mounted knife movable between the advancing means and coiling means for severing the wire, and abutting members in the path of the knife operable to support the wire during the severing operation but separable by the knife to permit continued movement thereof after the severing operation.

2. A machine of the class described having a pair of cooperating stationary members for coiling wire, one having a spiral groove facing toward and covered by the other of said members, means for advancing wire to and through said groove to be coiled by said members, a movable knife for severing the advancing wire before it reaches said members to limit the length of coils formed by said members, and opposed spring pressed guide members for the advancing wire provided beneath the wire with cooperating normally abutting portions to support the wire in the path of the knife before the severing operation, said guide members being movable relative to each other by the knife during the severing operation to permit its uninterrupted movement following the severing operation.

3. A machine of the class described having a pair of cooperating members for coiling wire, a support for at least one of said members having means through which the coils formed by said members may be discharged, means for advancing wire between the members to be coiled thereby, a movable knife for severing the advancing wire before it reaches the wire coiling members, and a pair of opposed spring pressed guide members for the advancing wire provided beneath the wire with cooperating normally abutting portions to support the wire in the path of the knife before the severing operation, said guide members being movable relative to each other by the knife during the severing operation to permit its uninterrupted movement following the severing operation, one of said opposed guide members being carried by the support aforesaid for one of the wire forming members.

4. A machine of the class described having a pair of cooperating members for coiling wire, a support for at least one of said members having means for directing the discharge of coils from said members, means for advancing wire between the members to be coiled thereby, a movable knife for severing the advancing wire before it reaches the wire coiling members, and a pair of opposed spring pressed guide members for the advancing wire having cooperating normally abutting portions to support the wire in the path of the knife before the severing operation, said guide members being movable relative to each other by the knife during the severing operation to permit its uninterrupted movement following the severing operation.

5. A machine having means for coiling wire, means for advancing the wire through the coiling means to be coiled thereby, means movable between the advancing means and coiling means for severing the wire into predetermined lengths, and normally abutting means in the path of the severing means for supporting the wire before the severing operation but separable by said severing means during the severing operation to permit continued movement of the severing means after the severing operation.

6. A machine having means for coiling wire, normally abutting members for guiding the wire to said coiling means, and means movable between said members for severing the wire, said guide members being movable relative to each other by the severing means during the severing operation to permit uninterrupted movement of said severing means following the severing operation.

7. A machine having means for coiling wire, normally abutting members for guiding the wire to said coiling means, and a knife movable between said members for severing the wire, portions of said members cooperating with each other to support the wire before the severing operation but separable by said knife during the severing operation to permit continued movement of the knife between said members after the severing operation.

8. A machine having cooperating members for coiling wire, normally abutting members for guiding the wire to said coiling members, one of said guide members being a support for at least one of the coiling members, and means movable between said guide members to sever the wire, said members being separable by the severing means during the cutting operation to permit continued movement of the severing means between said guide members.

9. A machine having means for coiling wire, means for advancing the wire through the coiling means to be coiled thereby, means movable between the advancing means and coiling means for severing the wire, and means in the path of the severing means operable to support the wire before the severing operation but separable by the severing means during the severing operation to permit continued movement of the severing means after the severing operation.

10. A wire coiling machine having means for coiling wire, means for advancing wire to and through said coiling means, means movable in timed relation to the advancement of the wire to sever the wire as it is advanced to determine the length of the coils to be formed, and a pair of opposed spring pressed guide members for the advancing wire having cooperating portions normally abutting each other in the path of the severing means and operable to support the advancing wire before the severing operation, said cooperating portions being momentarily movable away from each other by the severing means during the severing operation to permit uninterrupted movement of said severing means following the severing operation.

11. A wire coiling machine having a pair of cooperating wire coiling members, one of said members being carried by and fixed relative to the other, a support for said other of said members, means for advancing wire to and between said wire coiling members to be coiled thereby, means movable in timed relation to said advancing means for severing the wire as it is advanced, and opposed guide members for the advancing wire having portions normally abutting each other in the path of the severing means and operable to support the advancing wire before the severing operation, said portions being movable away from each other by the severing means during the severing operation, one of said guide members being carried by the support aforesaid for said wire coiling members.

12. A wire coiling machine having a pair of cooperating wire coiling members, means for advancing wire between said wire coiling members to be coiled thereby, means movable in timed relation to said advancing means for severing the wire as it is advanced, and opposed guide members for the advancing wire having portions normally abutting each other in the path of the severing means and operable to support the advancing wire before the severing operation, said portions being movable away from each other by the severing means during the severing operation.

13. In a wire coiling machine, a pair of cooperating wire coiling members disposed one inside the other, and means retaining said members in fixed relation to each other, including a coupling element engaging aligned holes in said members, said members having opposed substantially concentric annular portions, one of said annular portions having a spiral groove facing toward and covered by the annular portion of the other of said members whereby wire advanced lengthwise of said groove between said opposed annular portions will be formed thereby into a tubular coil, and one of said members being provided at the entrance end of and substantially tangent to said spiral groove with a hole through which wire to be coiled may be advanced to said groove.

HARRY W. WELCH.